J. R. CROSS.
DEVICES FOR SECURING PILLOW-SHAMS.
No. 193,854. Patented Aug. 7, 1877.
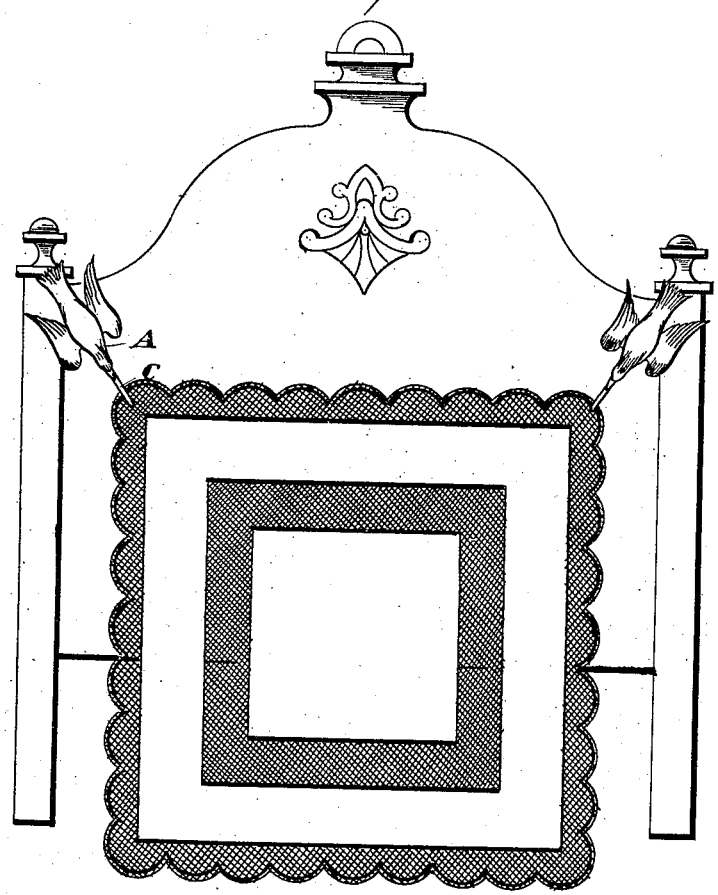
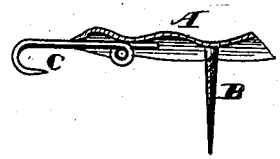
WITNESSES
INVENTOR
John R. Cross,
By Leggett and Leggett,
ATTORNEYS

UNITED STATES PATENT OFFICE.

JOHN R. CROSS, OF CLEVELAND, OHIO.

IMPROVEMENT IN DEVICES FOR SECURING PILLOW-SHAMS.

Specification forming part of Letters Patent No. 193,854, dated August 7, 1877; application filed February 28, 1877.

*To all whom it may concern:*

Be it known that I, JOHN R. CROSS, of Cleveland, in the county of Cuyahoga and State of Ohio, have invented certain new and useful Improvements in Device for Securing Pillow-Shams; and I do hereby declare the following to be a full, clear, and exact description of the invention, such as will enable others skilled in the art to which it pertains to make and use it, reference being had to the accompanying drawings, which form part of this specification.

My invention relates to an improvement in devices for securing pillow-shams in proper position upon the bed, and allowing of a ready attachment and detachment of the sham without liability to damage.

In the drawings, Figure 1 is a front elevation exhibiting my invention. Fig. 2 is a longitudinal section of the same.

A represents a plate, which may be the figure of a bird, butterfly, or any suitable figure or design whatever. To this is fixed a nail or screw, B, or a slot or hole may be cut into it for a purpose which will hereinafter appear. C is a spring or clamp, which, if desired, may be turned up into the shape of a hook, as shown in the drawing. The spring C is attached to the plate A, and is so fixed as that at or near its end it shall impinge against the plate A. These parts combined, as just specified, are to be attached to the head-board or post of the bed, as shown in Fig. 1, in such a position as to retain the shams in their proper place.

The shams may be attached by being inserted between the free end of the spring C and the plate A, or a loop may be fastened to the sham and this loop hooked over the bent portion of the spring, or slipped into a clamp or spring-hook.

My invention is susceptible of an indefinite variety of modifications, the principal object to be attained being to provide a device secured to a bedstead in a permanent manner, whereby the sham may be readily attached and held in position, while at the same time, although the sham may be constructed of delicate fabric, it may be carelessly pulled away from its attachment without danger of being injured. The sham-holder is rigidly secured to the bed by means of the screw B.

What I claim is—

A pillow-sham catch or holder, consisting of the plate A, having a screw, B, rigidly secured to one end, and a spring hook or clamp to the opposite end of the plate, substantially as described.

In testimony whereof I have signed my name to this specification in the presence of two subscribing witnesses.

JOHN R. CROSS.

Witnesses:
FRANCIS TOUMEY,
W. E. DONNELLY.